United States Patent

[11] 3,623,979

[72] Inventors Jim Maddox, Jr.;
William Schoen, both of Houston, Tex.
[21] Appl. No. 649,822
[22] Filed June 29, 1967
[45] Patented Nov. 30, 1971
[73] Assignee Texaco, Inc.
New York, N.Y.

[54] COMPOSITION AND PROCESS FOR INHIBITING CORROSION IN OIL WELLS
6 Claims, No Drawings
[52] U.S. Cl..................................................... 252/8.55 E,
21/2.5, 252/392, 260/309.6
[51] Int. Cl..................................................... C23f 11/10,
C23f 11/14, C07d 49/34
[50] Field of Search............................................. 252/8.55 E,
392; 260/309.6

[56] References Cited
UNITED STATES PATENTS
2,468,163 4/1949 Blair et al. .................... 252/8.55
2,756,211 7/1956 Jones............................ 252/8.55
2,763,612 9/1956 Raifsnider et al............. 252/8.55
2,773,879 12/1956 Sterlin.......................... 252/392 X
2,805,722 9/1957 Morgan et al................. 252/8.55 X
2,822,330 2/1958 Riggs et al. ................... 252/8.55
2,839,465 6/1958 Jones............................ 252/8.55
2,999,811 9/1961 Schell et al. .................. 252/8.55

*Primary Examiner*—Herbert B. Guynn
*Attorneys*—K. E. Kavanagh and Thomas H. Whaley ABSTRACT: Amide condensation products of polymeric acid and 1-aminoalkyl-2-alkyl-2-imidazoline for use in compositions of oil-soluble, brine-dispersible corrosion inhibitors. Continuous or intermittent application of liquid coatings of these inhibitors on metals, particularly ferrous metals, in contact with sweet and sour petroliferous well fluids, form persistent films which afford excellent protection against corrosion, even at elevated temperature.

COMPOSITION AND PROCESS FOR INHIBITING CORROSION IN OIL WELLS

This invention relates to inhibiting corrosion of metals found in contact with petroliferous well fluids or present in the production of natural gas. It is more particularly concerned with improved oil-soluble, water-dispersible compositions used for the prevention of corrosion of metals, particularly ferrous metals, in oil and gas production, collection, and distribution systems, and in the refinery.

The principal corrosive agents found in petroliferous well fluids and in the production of natural gas include hydrogen sulfide, carbon dioxide, oxygen, organic acids, and solubilized salts. These agents may be present individually or in combination with each other. Valves, fittings, tubing, pumps, precipitators, pipe lines, sucker rods, and other components of oil drilling and producing equipment are particularly susceptible to corrosion. Deposits of rust, scale, corrosive byproducts, paraffin, and other substances create ideal situations for concentration cells; and, pitting from carbon dioxide or hydrogen sulfide occurs under the covered areas. Acidic condensate that collects on metal tubing in gas condensate wells may also cause pitting. Furthermore, in sour gas or oil fields, it is common for sulfide attach on sucker rods and producing strings to cause deep pits, cracks, or even complete breaks. Downhole well temperatures may exceed 300° F. and accelerate corrosion.

Corrosion that occurs in primary production and water injection systems is rather complex. Evaluation of corrosion inhibitors for such application should include the study of variables such as: composition of water, oils and gases; fluid level of the wells; method and rate of production; water-oil ratio; wetting power of the oil; pH of the well fluids; bottomhole temperatures; quantity of hydrogen sulfide, carbon dioxide, oxygen, and other gases present; formation of the protective coatings such as paraffin from the oil or calcium carbonate from the water; and, composition of inhibitor and method of application.

In order to reduce inventories, achieve cost reduction by volume purchases, and obtain maximum treating effectiveness, a class of corrosion inhibitors, and compositions thereof are required which afford protection to metals in a variety of corrosive environments.

It is therefore a principal object of the present invention to provide an oil-soluble and brine-dispersible material for addition to sweet and sour petroliferous well fluids where rod and tubing failure from corrosion and cracking and where rod wear and pump corrosion are severe.

Another object of this invention is to provide an improved process for preventing the corrosion of metals in oil and gas production, collection, and distribution systems, and in the refinery.

It is a further object of this invention to provide an improved corrosion inhibitor for use in preventing ferrous metal oil-producing apparatus from corroding due to aqueous carbonic acids, sulfides, and soluble aliphatic acids encountered in hot petroliferous well fluids and in the production of natural gas.

A still further object of this invention is to provide a high-density liquid corrosion inhibitor for protective coating downhole oil well tubing.

According to the instant invention, novel oil-soluble dispersant free corrosion inhibitors are produced by condensing polymeric acid and 1-aminoalkyl-2-alkyl-2-imidazoline to produce members of a class of N-imidazolinylpolymeric acid amides having the generic formula

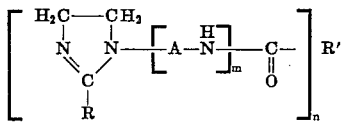

in which R attached to the 2-carbon atom of each imidazoline ring is the hydrocarbonaceous moiety of a tall oil fatty acid containing from 17 to 32 carbon atoms; A attached to the 1-nitrogen atom of each imidazoline ring is an ethylene or propylene group and $m$ is an integer from 1 to 6; R' is the hydrocarbonaceous moiety of a polymeric acid selected from the group consisting of dimer and trimer fatty acids, and higher molecular weight polymerized carboxylic acids containing from 15 to 70 carbon atoms; and $n$ is an integer from 2 to 4 and indicates the basicity of the polymeric acid.

The 1-aminoalkyl-2-alkyl-2-imidazoline precursor may be by reacting stoichiometric amounts of a high molecular weight monocarboxylic fatty acid with a polyalkylene polyamine of the formula $H_2N-[A-NH]_xH$ where A is a bivalent radical selected from the group consisting of ethylene and propylene and X is an integer from 2 to 7. The fatty acids in a typical high-fractionated tall oil consist mainly of a mixture of oleic, linoleic, conjugated linoleic, palmitic, and stearic. One or more of these tall oil fatty acids may be condensed with a polyalkylene polyamine such as diethylenetriamine, triethylenetetramine, and tetraethylenepentamine to provide the 1-aminoalkyl-2-alkyl-2-imidazoline precursor, as described more fully below.

The polymerized carboxylic acids, including dimeric and trimeric acids and mixtures thereof, which are reacted with the precursor just described to form the products of this invention may be produced by the polymerization of unsaturated fatty acids in accordance with a method such as described in the Journal of the American Oil Chemists Society 24, 65 (1947). Dimerized fatty acids suitable for preparing the amide condensation product of this invention include linoleic and eleostearic dimer acids. In the preparation of polymerized acids, members containing more than 3 moles as polymerized are not commercially feasible; however, the higher members such as tetramers containing 4 or more acid residues may be present in the residues from the preparation of the dimer and trimer acids. These residues containing higher molecular weight polymeric acids are also useful in the preparation of the inhibitors of the invention.

A suitable mixture of polymerized carboxylic acids is available commercially from the Harchem Division, Wallace & Tiernan, Inc., under the trade designation of Century D–75 polymerized fatty acid. Century D–75 is a mixture of polymerized carboxylic acids of high molecular weight containing approximately 80 percent dimer and trimer acids along with higher molecular weight polymeric acids and conforms to the following specifications:

| | |
|---|---|
| Free Fatty Acid (as Oleic) | 70–76% |
| Saponification Value | 175–185 |
| Iodine Value | 45–58 |
| Viscosity, SUS 210° F. | 325–400 |
| Molecular Weight (approx.) | 600 |

In concentrations from about 10–200 parts per million, the corrosion inhibiting compositions employed in the practice of this invention are extremely and surprisingly effective in protecting oil and gas well tubing and field equipment from corrosion even at temperatures to 300° F. It is postulated that the corrosion inhibitor forms an adherent protective film on the surface of the metal that resists the penetration of corrosive agents. The polar parts (nitrogen and oxygen) of the inhibitors molecule have an affinity for metal and bond the remainder of the macro molecule to the surface of the metal. The large spacious organic residue constituting the imidazolinyl amide of polymeric acid molecule contributes to the thickness and extent of the film. The NH groups in the molecular chain provide residual buffering power for acidic compounds found in sweet and sour petroliferous well fluids.

Of the many methods of treating wells with corrosion inhibitors, two of the most commonly used may be referred to as Periodic and Continuous treatments. Periodic or batch treatment of pumping wells comprises putting the corrosion inhibitor into the casing and tubing annulus and flushing it to the bottom by diverting the well stream from the flow line into the annulus. Produced fluids then diluted and entrain the inhibitors which coat contacting metal surfaces upon rising to the surface. In continuous treatment a small volume of inhibitor is injected into the production stream used to activate submerged hydraulic pumps in order to maintain a predetermined concentration of inhibitor.

The invention will be further illustrated but is not to be limited by the following specific examples.

EXAMPLE 1

To prepare a N-imidazolinylpolymeric acid amide corrosion inhibitor, the 1-aminoalkyl-2-alkyl-2-imidazoline precursor was prepared first by refluxing 57.6 grams (0.2 mol) of Acintol FAl tall oil fatty acid (to be described) and 20.6 grams (0.2 mol) of diethylenetriamine at a temperature of 280° C. for approximately 1.75 hours. During this time, 71 percent of the theoretical water formed by the reaction was collected. The reaction temperature was then increased to 290° C. and maintained for about 1 hour until 72.6 percent of the theoretically expected water was recovered. The amine equivalent of the reaction product was 198, but may range from 185 to 225. Progress of the reaction was followed by measuring the amount of water evolved and by inspection of amide (1,660–1,676 cm.$^{-1}$) and imide (1,606–1,620 cm.$^{-1}$) bands in the infrared spectrum.

The imidazoline precursor may be prepared by means of a preferred alternate procedure using a toluene azeotrope to remove approximately all of the theoretical water of reaction in about two hours at a maximum temperature of 240° C.

A N-imidazolinylpolymeric acid amide corrosion inhibitor was prepared by condensing about 1 to 3 mols of a 1-aminoalkyl-2-alkyl-2-imidazoline precursor with about 1 mol of Century D-75 dimer acid. The reaction temperature was held at 150° C. until infrared analysis indicated an increased size of amide band at about 1,660 cm.$^{-1}$. This reaction period took about 15 minutes for small batches. To prepare a corrosion inhibitor having maximum effectiveness it is important that this reaction be carried substantially to completion. This may be accomplished and the temperature of the reaction controlled as well by means of an alternate procedure in which a selective solvent is picked to form an azeotrope having a desired boiling point.

Acintol FAl used in the preparation of the precursor is a mixture of liquid tall oil fatty acids manufactured by the Arizona Chemical Co. and comprises:

| | |
|---|---|
| Rosin Acids, % | 4.2 |
| Unsaponifiables, % | 1.6 |
| Fatty Acids, Total, % | 94.2 |

The fatty acid composition comprises:

| | |
|---|---|
| Polyunsaturated, Conjugated, as Linoleic, % | 8 |
| Polyunsaturated, Non Conjugated, as Linoleic, % | 36 |
| Oleic by difference, % | 52 |
| Saturated, % | 4 |

Acintol FAl conforms to the following specification:

| | |
|---|---|
| Specific Gravity, 25°/25° C. | 0.91 |
| Acid Value | 195 |
| Saponification Value | 197 |
| Iodine Value (Wijs) | 131 |
| Viscosity, SUS, 100° F. | 100 |
| Flashpoint, open cup, ° F. | 380 |

EXAMPLES II to VII

The N-imidazolinylpolymeric acid amide of example I may be used in dispersant-free, oil-soluble corrosion-inhibiting compositions; for, under certain treating conditions dispersibility in brine or water may not be necessary or desirable. On the other hand, solvents, dispersants, weighting agents, and other materials may be mixed with N-imidazolinylpolymeric acid amide to formulate heat-resistant corrosion-inhibiting compositions for use in downhole protection of oil well tubing. Some preferred compositions of the invention in percent by weight are summarized in table I as examples II to VII.

TABLE I

| | EXAMPLES | | | | | |
|---|---|---|---|---|---|---|
| | II | III | IV | V | VI | VII |
| N-imidazolinylpolymeric acid amide | 20 | 20 | 20 | 27 | 18 | 20 |
| Brij 35 | 1 | | | | | |
| Surfonic N-300 | | 1 | | | | |
| Retzanol NP-500 | | | 1 | | | |
| Retzloff DRA-22 | | | | 7 | | |
| Armac C | | | | | 8 | |
| Tall Oil Imidazoline Acetate | | | | | | 6 |
| Zinc Chloride | | | | | 40 | 40 |
| Isopropanol | | | | | 17 | 17 |
| Water | | | | | 17 | 17 |
| Light Gas Oil Aromatic Solvent | 79 | 79 | 79 | 66 | | |

In examples II, III, and IV of table I, Brij 35, Surfonic N-300, and Retzanol NP-500 are typical water-soluble nonionic polyethoxylated dispersing agents suitable for the process of this invention. At a temperature of 20° C. they are white waxy solids. These materials perform the function of dispersing the inhibitor composition in well brines; and, to some extent they serve as wetting, spreading, or penetrating agents for filming the inhibitor onto the surface of the metal to be protected. These dispersants are characterized by hydrophobic-hydrophilic and lipophilic-hydrophilic structures which do not ionize in solution.

They are generally stable in either acid or alkaline systems and are compatible when blended with a cationic N-imidazolinylpolymeric acid amide inhibitor. Since they are derived from alkylene oxide (hydrophilic portion) additions to a fatty alcohol or alkylphenol, or a combination of the two (lipophilic portion) their oil or water solubility can be easily controlled.

Brij 35 is a polyoxyethylene lauryl alcohol condensation product formed by reacting ethylene oxide with lauryl alcohol. It is manufactured and sold commercially by Atlas Powder Co. Brij 35 has a specific gravity of about 1.20 and is soluble in hard water (20,000 p.p.m.). Surfonic N-300 is a nonionic surface active agent and is the reaction product or adduct of nonylphenol and ethylene oxide. It too is useful as an emulsifier, wetting agent, detergent, penetrant, solubilizing agent, and dispersant. The mole ratio of ethylene oxide to nonylphenol in Surfonic N-300 is about 30:1 and the average length of the hydrophilic polyoxyethylene chain is about 30 oxyethylene ($-OCH_2CH_2-$) units. It is a nonelectrolyte, essentially neutral, and manufactured and sold by the Jefferson Chemical Co. Surfonic N-300 has a theoretical molecular weight of about 1540, a specific gravity of about 1.09, a refractive index of about 1.47, and a viscosity (SUS) at 210° F. of about 160. Retzanol NP-500 is a nonionic dispersing agent with properties similar to Surfonic N-300 but having a 50:1 mole ratio of ethylene oxide to nonylphenol. Retzanol NP-500 is manufactured and sold by Retzloff Chemical Co.

To formulate compositions of the type shown in table I, examples II, III and IV, 0.5 to 1.5 percent of nonionic dispersing agent was mixed with about 15 to 35 percent cationic N-imidazolinylpolymeric acid amide at a temperature of about 150° C. The mixture was then diluted with about 65 to 85 percent light gas oil aromatic solvent.

In example V of table I, Retzloff DRA 22 is a polyol type polymeric demulsifier that effectively prevents emulsification or assists in breaking any emulsions that are produced during well treatment. Retzloff DRA 22 acts like Brij 35 or Surfonic N-300 to disperse N-imidazolinylpolymeric acid amide corrosion inhibitors in brine. The oil-soluble brine-dispersible formulation represented by example V may be added to produce fluids in relatively low concentrations to provide corrosion control in the tubing and flow lines and to promote demulsification of the crude oil in heaters and other treating facilities.

Compositions of the type shown in table I, example V may be prepared by mixing together at a temperature of 150° C. about 15 to 35 percent corrosion inhibitor and about 4 to 10 percent Retzloff DRA 22. This mixture is then diluted with about 55 to 81 percent of a mutual aromatic solvent. Retzloff DRA 22 is manufactured and sold commercially by Retzloff Chemical Co. It may be prepared by ethoxylating a low molecular weight polypropylene glycol and has a specific gravity of about 1.07, a viscosity of about 800 ctks. at 77° F., and an average molecular weight of about 5223.

In examples VI and VII, zinc chloride is added as a weighting agent to sink the corrosion inhibitor through the fluids present in the well to the bottom, where the heavy material separates or diffuses from the mixture and the organic inhibitor is released into the well fluids. As the lighter inhibitor phase rises to the surface, it coats the tubing with a protective film. Armac C (cocoamine acetate) and tall oil imidazoline acetate in compositions VI and VII respectively are members of a class of neutral salts formed from high molecular weight brine-soluble fatty acid derived amines with low molecular weight brine-soluble fatty acids. These materials control the release of the corrosion inhibitor into the well fluids by a mechanism as yet unknown. Although the formulations are stable without them, release of the inhibitor would be slow. Upon hydrolyzing in the well fluids, they selectively diffuse and dissolve in oil and water and no longer act as emulsifiers. The corrosion inhibitor then dissolves in the oil and forms a film on the metal tubing as the oil rises in the well bore. By varying the amount of these releasing agents in the composition, the rate of release of corrosion inhibitor may be adjusted. The density of compositions VI and VII is approximately 10.5 lbs. per gallon.

To formulate compositions of the type shown in table I, examples VI and VII, 15 to 20 percent corrosion inhibitor was mixed with about 1 to 10 percent of releasing agent. Then with agitation and gentle heating the mixture was dissolved in a solution containing from about 30 to 60 percent of zinc chloride dissolved in about 20 to 40 percent of a 1:1 solvent mixture of water and isopropanol. The isopropanol solvent is one member of a class of low molecular weight alcohols having appreciable water solubility. Other suitable $C_1$ through $C_4$ alcohols may be used. The purpose of the alcohol in the composition is to facilitate solubilization of both the active ingredients and the $ZnCl_2$ in water. Other suitable heavy metal weighting agents which are compatible in the system may be used in these compositions in place of the zinc chloride. The $ZnCl_2$ in compositions VI and VII will precipitate as ZnS in a sour environment containing $H_2S$.

Armac C is manufactured and sold commercially by Armour Chemical Division. It is a primary amine acetate derived from coconut fatty acids and has an iodine number of 11, amine acetate percent of 83, and neutralization percent of about 100.

Tall oil imidazoline salts may be made by neutralizing the 1-aminoalkyl-2-alkyl-2-imidazoline precursor prepared in example I with stoichiometric amounts of a relatively short chain saturated aliphatic acid such as acetic, adipic, or azelaic. In addition to its use as a releasing agent, effective water-soluble corrosion inhibitor compositions for treating brines prior to their injection into low-permeability formations may be prepared from tall oil imidazoline acetate by diluting the alcohol solutions with water until the final total alcohol concentration is about 15–25 weight-percent and the tall oil imidazoline acetate is about 25–32 percent. A 1 percent solution of this composition in distilled water is clear and shows little tendency to "salt out" in brine. Evaluated by the "Continuous Exposure Test" to be described later, a concentration of 25 p.p.m. of inhibitor in 10 percent light gas oil 90percent bring gave corrosion penetration rates of 1.3 mpy and 5.7 mpy in "sweet" and "sour" environments respectively.

Dynamic tests simulating field usage were used to evaluate the corrosion inhibitors of this invention for their ability to protect metals immersed either in sweet or sour fluids. Two methods of well treatment simulated by these tests are "Continuous Exposure" or constant concentration and "Persistent Filming" for intermittent high concentration additions. A description of the test procedures follows.

General Test Procedure

A sandblasted mild steel test specimen, 3 inches × 0.5 inches × 0.005 inches thick is weighed and inserted in a 4-ounce glass bottle containing 100 ml. of a filming mix. One ml. of 6 percent acetic acid is added to each bottle containing water or brine in the filming mix. The bottles are then attached to the spokes of a 23-inch diameter vertically mounted wheel and rotated for the time specified below at 30 r.p.m. in an oven maintained at 120° F. for sour filming mixes and 160° F. for sweet filming mixes. As the wheel revolves, the filming mix passes back and forth over the test specimen. At the end of the test period, the test specimen is removed from the bottle, washed with dilute acid, scrubbed with scouring cleanser, and reweighed. From the specimen weight loss, area, metal density, and time of exposure, calculations are made and test results are reported as the "Corrosion Penetration Rate" in mils per year (mpy).

Simulation of Continuous Treatment

Continuous addition of inhibitor is the oldest type of corrosion control treatment for wells producing hydrocarbons and water and in water-injection systems. Metal to be protected is continuously contacted with low concentrations of inhibitor in the range of about 10 to 100 p.p.m., basis total fluids. In the "Continuous Exposure Test," continuous well treatment is simulated in the laboratory by testing a fixed concentration of 25 p.p.m. of inhibitor in a mixture of 10 percent light gas oil and 90 percent brine. Sweet and sour environments are simulated by saturating the filming mixes respectively with carbon dioxide and hydrogen sulfide. The concentration of 25 p.p.m. is within the 10 to 100 p.p.m. mentioned previously and constitutes a severe test for most inhibitors. Steel test specimens are exposed to the filming inhibitor mix for 72 hours, in accordance with the general test procedure described above.

Simulation of Persistent Filming Treatment

Many producing wells, and some water-injection systems are treated periodically with high-concentration mixes that are diluted during application with produced brine or oil, freshwater, or refined hydrocarbon. For example, a mix of a few gallons of inhibitor in a few barrels of diluent injected into the annulus of a nearly "pump-off" well may reach the downhole pump with little change in concentration. As the pump lifts the filming inhibitor mix up the tubing, the mix diluted by the production will treat the pump, rods, and tubing walls. In effect, the extremes of inhibitor concentration may range from nearly full strength to considerably lower concentrations, depending upon the rate of production. In such treatment, corrosion inhibitor effectiveness depends upon the persistence of the film initially formed on the metal surface.

The "Persistent Filming Test" comprises three consecutive steps: In the first or filming step, a protective film of corrosion inhibitor is applied to the metal specimen by means of the same procedure followed in the "Continuous Exposure Test," except that the exposure time is 1 hour and the filming inhibitor mix is one of the three fluids described below; in the second or rinsing step, the test specimens are transferred to new bottles containing fresh fluids of the same type used during the first step but containing no inhibitor, and then rotated on the wheel in the oven at 120° F. (for sour mixes) or 160° F. (for sweet mixes) for 1 hour; and finally, in the third or exposure step, the test specimens are transferred to new bottles containing no inhibitor but containing 10 percent fresh light gas oil and 90 percent brine, and gas of the same type used during the first and second steps, and then rotated on the wheel at 120° F. (sour) or 160° F. (sweet) for 72 hours.

The variables of inhibitor concentration and composition of well fluids are recognized in the Persistent Filming Test by employing the following three inhibited filming mixes: (a) 1 gallon of inhibitor per barrel of light gas oil (2.3 percent inhibitor); (b) 0.2 percent inhibitor concentration in a mixture of 10 percent light gas oil and 90 percent brine containing 10 percent sodium chloride and 0.5 percent calcium chloride; and (c) 1 gallon of inhibitor per barrel of fresh water (2.3 percent inhibitor). Mixes (a), (b) and (c), to simulate sweet and sour fluids, are saturated with carbon dioxide and hydrogen sulfide respectively.

The preferred corrosion inhibitor compositions shown in table I were evaluated by the previously described "Continuous Exposure Test" and the "Persistent Filming Test."

Penetration rates expressed in mils per year for steel specimens in contact with the corrosion-inhibiting fluids and blank runs made on unprotected steel specimens under the eight test conditions described are reported in table II. A comparison of the test data shown in table II for compositions II to VII with the test data for the blank runs clearly demonstrates the effectiveness of these compositions to prevent the corrosion of metals in petroliferous well fluids.

The importance of completely reacting the dimer acid with the 1-aminoalkyl-2-alkyl-2-imidazoline precursor is illustrated in table II by comparing the test results for compositions II and VIII. The ingredients in both compositions are the same but composition VIII is merely an unreacted mixture of the precursor and the dimer acid. From the data shown in table II it is apparent that composition II is superior to composition VIII with respect to corrosion protection. However, in addition composition II is a more reliable inhibitor.

TABLE II.—INHIBITOR EVALUATIONS

[Corrosion penetration rate—mils per oear]

| Inhibitor composition | Average | | | Sweet environment fluids saturated with carbon dioxide | | | | Sour environment fluids saturated with hydrogen sulfide | | | |
| --- | --- | --- | --- | --- | --- | --- | --- | --- | --- | --- | --- |
| | All tests | Sweet tests | Sour tests | Continuous exposure, 25 p.p.m. 10-90 [1] | Persistent filming filmed from | | | Continuous exposure, 25 p.p.m. 10-90 [1] | Persistent filming filmed from | | |
| | | | | | 2.3% in oil | 0.2% in 10-90 [1] | 2.3% in F.W. | | 2.3% in oil | 0.2% in 10-90 [1] | 2.3% in F.W. |
| II | 1.7 | 1.8 | 1.6 | 2.3 | 1.6 | 1.2 | 2.0 | 1.2 | 1.2 | 0.8 | 2.4 |
| III | 1.4 | 1.4 | 1.4 | 1.2 | 1.6 | 1.2 | 1.6 | 1.6 | 1.2 | 1.2 | 1.6 |
| IV | 1.2 | 1.2 | 0.9 | 1.6 | 1.2 | 1.2 | 1.6 | 1.2 | 0.8 | 0.8 | 0.8 |
| V | 1.8 | 1.9 | 1.7 | 0.8 | 2.4 | 2.0 | 2.4 | 0.8 | 2.0 | 1.6 | 2.4 |
| VI | 1.9 | 1.9 | | 0.8 | 1.6 | 3.6 | 1.6 | | | | |
| VII | 1.5 | 1.5 | | 1.6 | 1.6 | 0.8 | 2.2 | | | | |
| VIII | 5.4 | 4.4 | 6.4 | 1.1 | 1.7 | 14.0 | 0.7 | 1.7 | 3.1 | 19.2 | 1.5 |
| Blank run | 32.8 | 14.8 | 50.8 | 14.8 | 14.8 | 14.8 | 14.8 | 50.8 | 50.8 | 50.8 | 50.8 |

[1] 10% light gas oil—90% brine.

The compositions and process of the invention have been described generally and by examples with reference to particular compositions for purposes of clarity and illustration only. It will be apparent to those skilled in the art from the foregoing that various modifications of the process and the compositions disclosed herein can be made without departure from the spirit of the invention.

We claim:
1. An oil-soluble brine-dispersible corrosion-inhibiting composition in percentage by weight
   a. from about 15 to 35 percent of an amide condensation product of polymeric acid and 1-aminoalkyl-2-alkyl-2-imidazoline represented by the formula

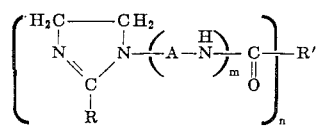

in which R is a tall oil fatty acid residual hydrocarbon radical containing from 17 to 32 carbon atoms; A is a bivalent ethylene radical; $m$ is an integer from 1 to 6; R' is a residual hydrocarbon radical of a polymeric acid containing from 15 to 70 carbon atoms and is selected from the group consisting of dimer, trimer, and higher molecular weight polymerized carboxylic fatty acids and mixtures thereof; and $n$ is an integer from 2 to 4 and indicates the basicity of the polymeric acid;
   b. from about 0.5 to 1.5 percent of dispersing agent selected from the group consisting of compounds having the formula ROW, wherein R is a straight-chain hydrocarbon radical containing 12 to 20 carbon atoms, 0 is oxygen, and W is a polyoxyethylene chain containing about 10 to 30 oxyethylene groups and ethoxylated nonylphenol; and
   c. from about 63.5 to 84.5 percent of a light gas oil aromatic solvent mutually soluble in oil and components $a$ and $b$.

2. The corrosion-inhibiting composition according to claim 1 in which the 1-aminoalkyl-2-alkyl-2-imidazoline of $a$ is made by the reaction of a tall oil fatty acid selected from the group consisting of linoleic, conjugated linoleic, oleic, and stearic, and a polyalkylene polyamine selected from the group consisting of diethylenetriamine, triethylenetetramine, and tetraethylenepentamine; and the polymeric acid is a dicarboxylic acid having a molecular weight of about 600 and comprising approximately 70 to 76 percent by weight of dimerized linoleic acid.

3. A high-density corrosion-inhibiting composition in percentage by weight
   a. from about 15 to 35 percent of an amide condensation product of polymeric acid and 1-aminoalkyl-2-alkyl-2-imidazoline represented by the formula

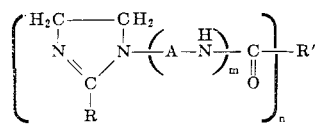

in which R is a tall oil fatty acid residual hydrocarbon radical containing from 17 to 32 carbon atoms; A is a bivalent ethylene radical; $m$ is an integer from 1 to 6; R' is a residual hydrocarbon radical of a polymeric acid containing from 15 to 70 carbon atoms and is selected from the group consisting of dimer, trimer, and higher molecular weight polymerized carboxylic fatty acids and mixtures thereof; and $n$ is an integer from 2 to 4 and indicates the basicity of the polymeric acid;
   b. from about 1 to 10 percent of a releasing agent selected from the group consisting of cocoamine acetate and tall oil imidazoline acetate;
   c. from about 30 to 60 percent of zinc chloride weighting agent;
   d. from about 10 to 20 percent isopropanol; and
   e. from about 10 to 20 percent water.

4. An oil-soluble, brine-dispersible corrosion-inhibiting composition consisting of
   a. from about 15 to 35 weight-percent of amide condensation product of polymeric acid and 1-aminoalkyl-2-alkyl-2-imidazoline represented by the formula

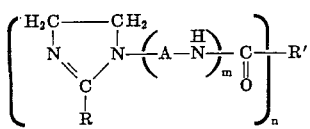

in which R is a tall oil fatty acid residual hydrocarbon radical containing from 17 to 32 carbon atoms; A is a bivalent ethylene radical; $m$ is an integer from 1 to 6; R' is a residual hydrocarbon radical of a polymeric acid containing from 15 to 70 carbon atoms and is selected from the group consisting of dimer, trimer, and higher molecular weight polymerized carboxylic fatty acids and mixtures thereof; and $n$ is an integer from 2 to 4 and indicates the basicity of the polymeric acid.

b. from about 0.5 to 10 weight-percent of an ethoxylated polypropylene glycol demulsifying agent; and c. from about 55 to 85 weight-percent of light gas oil aromatic solvent mutually soluble in oil and components $a$ and $b$.

5. A method of protecting metals from corrosive agents in sweet and sour petroliferous well fluids which comprises contacting the metal with an amide condensation product represented by the formula

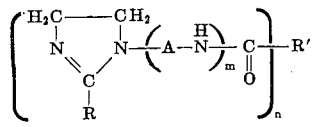

in which R is a tall oil fatty acid residual hydrocarbon radical containing from 17 to 32 carbon atoms; A is a bivalent ethylene radical; $m$ is an integer from 1 to 6; R' is a residual hydrocarbon radical of a polymeric acid containing from 15 to 70 carbon atoms and is selected from the group consisting of dimer, trimer, and higher molecular weight polymerized carboxylic fatty acids and mixtures thereof, and $n$ is an integer from 2 to 4 and indicates the basicity of the polymeric acid.

6. A process of inhibiting corrosion of ferrous oil and gas well equipment in contact with sweet and sour petroliferous well fluids comprising, mixing said well fluids with the inhibiting composition of claim 1 to effect a minimum concentration by weight of inhibitor to well fluids of 10 parts per million.

* * * * *